Dec. 15, 1959  C. M. GROSCHEN  2,916,851
TOY VEHICLE CAB CONSTRUCTION
Filed Jan. 13, 1958  2 Sheets-Sheet 1
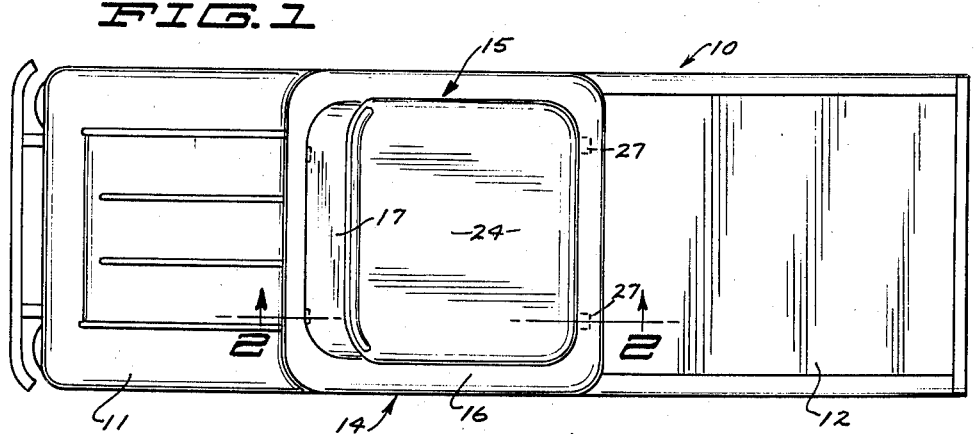
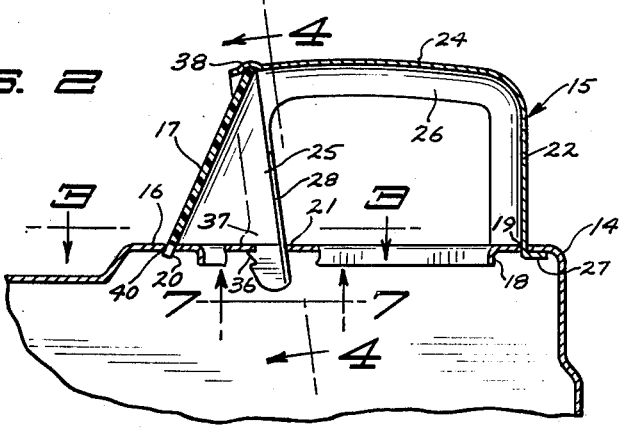
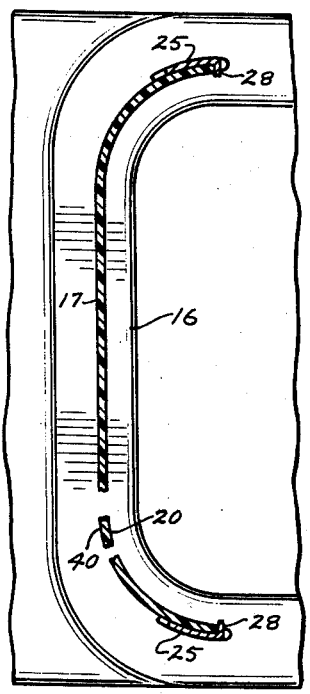
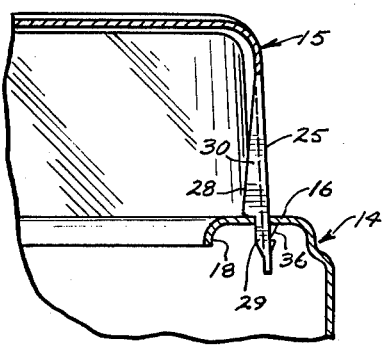
INVENTOR.
CHARLES M. GROSCHEN
BY
ATTORNEYS Dec. 15, 1959     C. M. GROSCHEN     2,916,851
TOY VEHICLE CAB CONSTRUCTION
Filed Jan. 13, 1958                              2 Sheets-Sheet 2
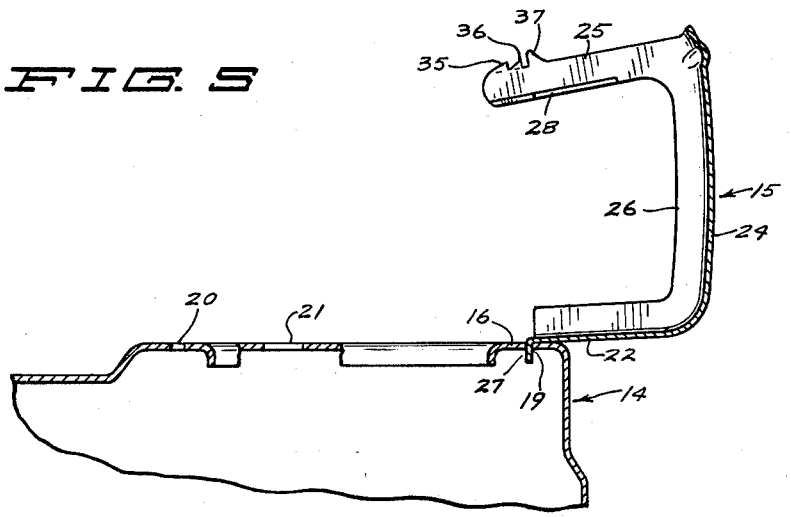
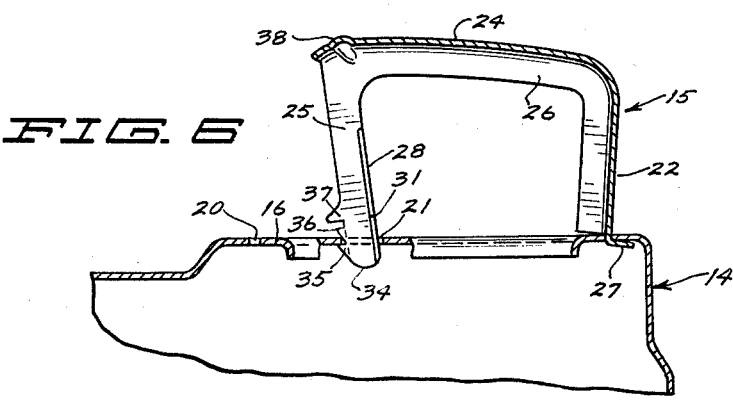
INVENTOR.
CHARLES M. GROSCHEN
BY
Carlsen & Hayle
ATTORNEYS

United States Patent Office 2,916,851
Patented Dec. 15, 1959

2,916,851

TOY VEHICLE CAB CONSTRUCTION

Charles M. Groschen, Mound, Minn., assignor to Tonka Toys, Inc., Mound, Minn., a corporation of Minnesota Application January 13, 1958, Serial No. 708,619

9 Claims. (Cl. 46—221)

This invention relates generally to toy vehicles, such as trucks, and particularly concerns the construction of the vehicle cab and the means of mounting the cab on the vehicle body.

In the manufacture of toy vehicles of sheet metal or the like it is common practice to fabricate the vehicle body and driver cab independently and then mount the cab in the desired position. Heretofore such mounting has necessitated a welding operation or in the alternative a step where connecting tabs are bent under or the like. Furthermore it has been found that where rigid windshields are used and are held in place between the cab and body, the cab and body members must be separately painted prior to mounting, or the windshield masked, to prevent the windshield from being subjected to the paint spray. It is with these problems that the present invention is primarily concerned.

A principal object of the invention is to provide a novel toy vehicle construction wherein the cab may be readily and simply mounted and locked on the vehicle body by merely placing it in position without the need of an entirely separate manufacturing step.

Another important object of the invention is to provide a toy vehicle construction wherein the vehicle windshield is automatically locked in position when the cab is mounted on the vehicle body.

Another important object of the invention is to provide a toy vehicle construction wherein a transparent windshield is held in position between the vehicle cab and body after the cab has been placed in a locked primary position for painting of the vehicle and then moved to a locked secondary position where it will hold the windshield in place.

With these and still additional objects of the invention in mind the invention broadly comprises a toy vehicle construction wherein the vehicle cab is connected at the rear to the vehicle body by means of a simple insertable connection which becomes positive as the front part of the cab is lowered against the body and with the front corner posts of the cab having teeth which automatically lock with the body to securely mount the cab on the body and clamp the windshield in position therebetween. The invention is further characterized by providing two of said locking teeth on each corner post adapted to lock successively with the body with the cab in primary and secondary positions so that the windshield may be inserted between the cab and body with the cab in the primary position and positively locked between the two with the cab in its secondary position.

The above mentioned and other objects of the invention will be brought to light during the course of the following specification, reference being made to the accompanying drawings, in which—

Fig. 1 is a plan view of a toy truck incorporating the novel cab construction.

Fig. 2 is a longitudinal vertical section through the cab and a portion of the truck body taken on line 2—2 of Fig. 1.

Fig. 3 is a horizontal section through the cab windshield and corner posts taken on line 3—3 of Fig. 2 and looking downward.

Fig. 4 is a transverse substantially vertical section taken on line 4—4 of Fig. 2.

Fig. 5 is a longitudinal vertical section similar to Fig. 2 but showing the cab in its initial position during the cab mounting operation.

Fig. 6 is similar to Fig. 5 but shows the cab in a primary locked or paint subjecting position prior to insertion of the windshield.

Fig. 7 is an enlarged inverted plan view of the cab corner post and body connection looking upwardly along the line 7—7 of Fig. 2.

Referring now more particularly to the drawings reference numerals will be used to denote like parts and structural features in the different views. In Fig. 1 a toy truck is denoted generally at 10. The truck has a front hood section 11, a rear truck bed 12 and a central body portion 14. The truck cab is mounted on the body portion 14 and is designated generally at 15.

The body portion 14 of the truck is provided at the top with an inwardly directed, continuous, horizontal flange 16 which serves as a platform for supporting the truck cab 15. The truck body members thus far described are made of stamped sheet metal. A windshield of transparent plastic is denoted at 17 and is mounted in conventional position across the front of the cab between the flange 16 and the roof of the cab.

The flange 16 is stiffened by a rib 18 which extends along its inner edge. The rear section of flange 16 is provided with a pair of transversely spaced transverse slots 19 (Fig. 2). The front section has a pair of similar slots 20 (Figs. 2 and 3). The side sections of the flange 16 each has an arcuate slot 21 as best shown in Fig. 7.

The cab 15 will now be described in detail. It has a rear wall 22, which may be provided with a window, a roof 24 extending forwardly from the rear wall, a pair of front corner posts 25, and opposing partial side walls 26 which jointly with the posts 25 frame the top and sides of window openings at the sides of the cab. A pair of tongues 27 project at right angles from the lower edge of rear wall 22. These are spaced apart to correspond with the slots 19 and are of such a width as to fit rather snugly within the slots.

Each post 25 has an inwardly turned flange 28 along its rear edge. This flange as best shown in Fig. 4 has a lower portion 29 adapted to fit snugly crosswise in the slot 21. The upper portion 30 of the flange tapers upwardly and a downwardly facing shoulder 31 is formed at the juncture of the portions 29 and 30.

The forward edge of each post 25 and particularly the lower portion thereof is formed as best shown in Figs. 2 and 6. The lower end of the post is rounded as at 34 and as the forward edge extends upwardly, forwardly first and second locking teeth denoted at 35 and 36 are formed therein. Spaced slightly above the upper face of tooth 36 a stop 37 is formed. Teeth 35 and 36 are bent laterally slightly out of the plane of the post as best observed in Fig. 7.

Posts 28 are formed so as to be aligned with the slots 21 when the tabs 27 have been inserted in slots 19.

A downwardly opening groove 38 is formed to extend transversely along the front portion of the roof 24 just behind the leading edge thereof. This groove curves slightly rearward near its ends as may be observed in Fig. 1.

Windshield 17 has a pair of tabs 40 adapted to be inserted in the narrow slots 20.

The manner of attachment of the cab 15 to the body 14 will now be understood. The first step is shown in Fig. 5 where the tongues 27 have been inserted in slots 19 to form a hinge connection between the body and cab. The cab is then swung downwardly until the lower rounded ends 34 of posts 25 enter the slots 21. The posts will yield slightly allowing the forwardly directed tooth 35 to pass over and catch under the edge of flange portion 16 which forms the forward end portion of slot 21. The cab is then in the primary position shown in Fig. 6. It is in this condition that the vehicle is passed through the spray painting station.

When the painting operation has been completed windshield 17 is placed in position with the tabs 40 extending through the openings 20 and cab 15 is pressed downwardly about its hinge connection 19—27 forcing posts 25 farther through slots 21 until flange 16 is engaged between the tooth 36 and stop 37. As this occurs the upper edge of windshield 17 becomes seated in the groove 38 formed along the front portion of the cab roof 24. Cab 15 is now securely locked to the body and the windshield irremovably held between the cab roof 24 and the body portion 16.

It will be observed (Fig. 4) that the lower portion 29 of flange 28 is of such a width as to fit snugly crosswise within the slot 21 to prohibit any transverse movements of the posts. It will also be noted, in Fig. 7, that the locking teeth are bent slightly outward to provide a more positive locking arrangement which prohibits any looseness or rattling.

The cab 15 may thus be securely mounted on the truck body 14 in two successive stages allowing the windshield to be placed after the painting operation. Furthermore the mounting means eliminates the necessity of any fold under or tab crimping operations after the cab has been placed in position. I have thus provided a toy truck cab construction which economically and effectively carries out the aforementioned objectives.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a toy vehicle having an elongated body and a cab, the means of mounting the cab upon the body which comprises providing the body with a transverse rear slot and a pair of transversely spaced forward openings, which slot and openings are vertically directed, the cab having a rear wall and a pair of front corner posts adapted to respectively align with said slot and openings, the rear wall having a rearwardly directed tab along its lower edge adapted to hook into the body through said slot, and locking means on the corner posts each comprising a laterally formed arcuate tooth integral with said posts permitting insertion of the posts into the forward openings with the upper edge of said arcuate tooth engaging the underside of the platform thereby prohibiting the withdrawal thereof.

2. In a toy vehicle, an elongated vehicle body having a centrally disposed horizontal cab mounting platform, a cab having a rear wall and a pair of transversely spaced front corner posts, means conecting the lower edge of the cab rear wall to the mounting platform, a pair of transversely spaced catch forming edges near the front of the platform, and each of said posts having a laterally bent latch tooth projecting toward one of said edges, each of said teeth having a downwardly tapering edge allowing the tooth to slide over and engage under the catch forming edge to lock the post to the platform.

3. In a toy vehicle construction, a vehicle body member having a cab mounting horizontal platform, said platform having an upwardly opening slot in the front portion thereof, a cab member having a roof, said roof having a transversely extending downwardly opening groove therein, an elongated windshield member having one longitudinal edge adapted to seat in said groove and a tab projecting outwardly from the opposing edge, and means for integrally mounting the cab member on the platform with the cab roof spaced above the platform and the windshield member irremovably held between the roof and platform with the tab seated in the slot and said longitudinal edge thereof seated in the groove of the roof.

4. In a toy vehicle construction, a vehicle body, a cab having a roof, a rear wall and a pair of front corner posts, means forming a pivotal connection between the rear wall of the cab and the body for limited swinging movement of the roof and corner posts of the cab toward and away from the body, means for locking the corner posts to the body with the cab roof in primary and secondary positions relative to the body, windshield retention means formed in the roof and body for securely holding the windshield therebetween when the cab roof is in its secondary positions, and the corner post locking means comprising a pair of transversely spaced catch means on the body forward of the axis of said pivotal connection, and first and second latch teeth integrally formed on each corner post adapted to engage one of the catch means to respectively lock the post with the roof in primary and secondary positions.

5. In a toy vehicle, a body extending longitudinally fore and aft relative to the direction of vehicle travel, a cab having a rear wall and a roof extending forwardly from the rear wall, means providing a pivotal connection between the cab rear wall and the body with the roof extending forwardly over the body and allowing limited swinging movement of the roof toward and away from the body, a windshield adapted to fit in upright position between a transversely extending downwardly opening groove in the roof and the body, and means extending downwardly from the front portion of the roof adapted to engage and lock against the body to secure the windshield in said upright position between the roof and body.

6. In a toy vehicle, a vehicle body member having a cab mounting platform, said platform having an upwardly opening slot on one end thereof, a cab member having a roof, said roof having a transversely extending downwardly opening groove therein, a pair of transversely spaced front corner posts extending downwardly from the roof in the proximity of either end of said groove, said corner posts having an arcuate horizontal cross section, an elongated windshield member having one longitudinal edge adapted to seat in said groove, a tab projecting outwardly from the opposing longitudinal edge of the windshield and the end portions of the windshield having horizontal arcuate sections, and means for integrally mounting the cab member on the platform with the windshield irremovably held between the cab roof and the platform with the tab seated in the slot, the longitudinal edge seated in the groove and at least part of the arcuate end portions of the windshield fitting contiguously against arcuate surfaces of the corner posts.

7. Apparatus as in claim 6 wherein said corner posts have vertically disposed stops at the rearward edge thereof for engaging the butt ends of the said windshield member.

8. In toy vehicle construction, a vehicle body extending fore and aft relative to direction of vehicular traffic and having an inside surface, a cab having a roof with depending support members, a windshield adapted to fit in an upright position between the roof and the body, at least one upwardly opening slot in said body, and locking means for locking said depending support members to the body and locking the cab in first and second mounted positions, said locking means including at least a first and second locking tooth integrally formed with and vertically disposed on one of said depending members, each tooth having an upper edge adapted to engage the inside surface of the body only after the respective tooth has been inserted through said upwardly opening slot, said upper edge of the first tooth operative to engage the inside surface of the body thereby locking the cab in said first mounted position and said upper edge of the second tooth operative to engage the inside surface of the body thereby locking the cab in said second mounted position, and said windshield being removably held in said upright position when the cab is in said first position and irremovably held when the cab is in said second position.

9. In a toy vehicle construction, a vehicle body having a cab mounting platform, said platform having an upwardly opening slot in the front portion thereof, a cab member comprising a roof having a pair of transversely spaced front corner posts and a downwardly depending support at the rear of the roof, said corner posts having inwardly directed upright flanges along their rear edges, means forming a rearwardly facing abutment extending transversely along the underside of the front edge portion of the roof, locking means for securing the corner posts and the support to the body with the roof spaced above the platform, and an upright transversely elongated windshield irremovably held between the roof and platform with a portion of the lower edge of the windshield seated in said slot, the upper edge portion of the windshield disposed behind and against the abutment to prohibit forward movement of the windshield, and the end portions of the windshield curving rearwardly and engaging against said inwardly directed flanges to prohibit rearward movement of the windshield.

References Cited in the file of this patent

UNITED STATES PATENTS

| | | |
|---|---|---|
| 1,732,456 | Berger | Oct. 22, 1929 |
| 1,973,220 | Mohr | Sept. 11, 1934 |
| 2,024,590 | Lindstrom | Dec. 17, 1935 |
| 2,587,142 | Gray et al. | Feb. 26, 1952 |
| 2,756,086 | Wade | July 24, 1956 |
| 2,793,061 | Dall | May 21, 1957 |

FOREIGN PATENTS

| | | |
|---|---|---|
| 345,219 | Germany | Dec. 6, 1921 |